Jan. 7, 1941. W. S. TINDALL 2,227,917
AUTOMOBILE SIGNAL SWITCH
Filed Feb. 23, 1938
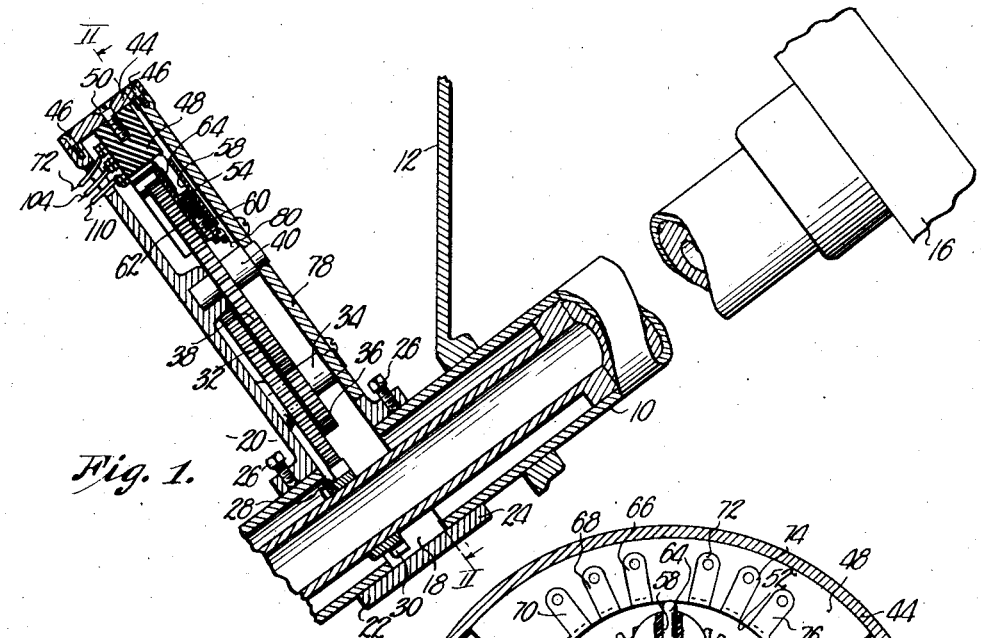
Fig. 1.
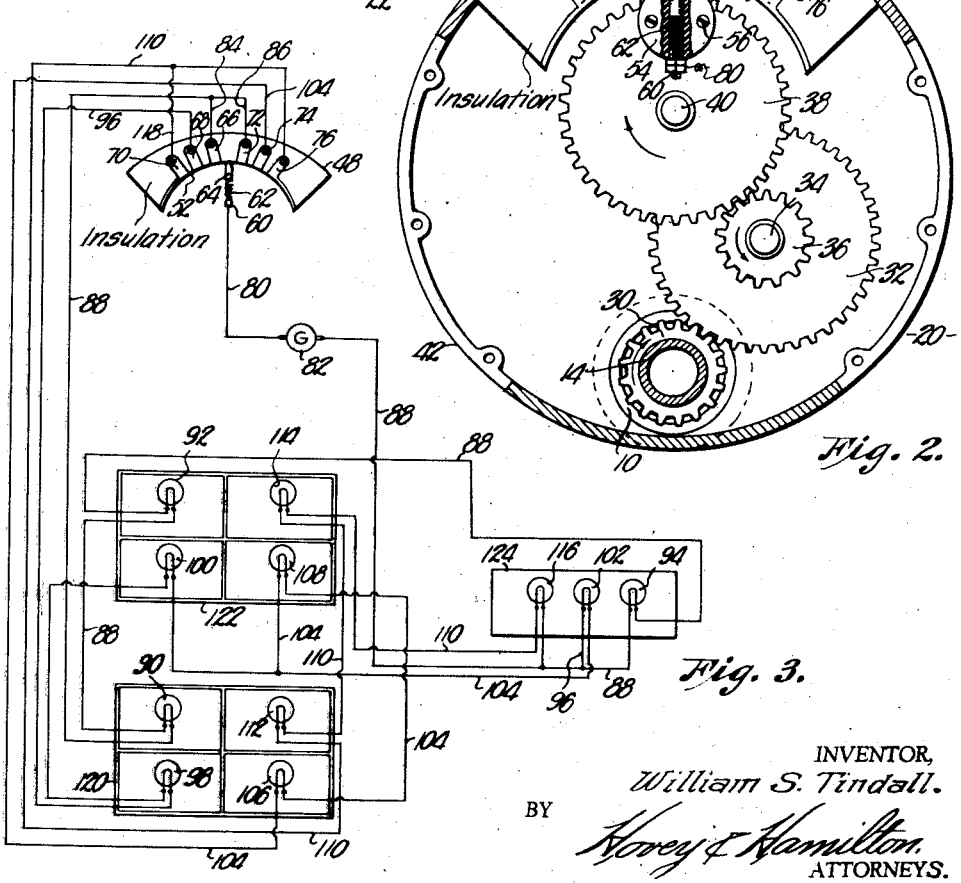
Fig. 2.
Fig. 3.
INVENTOR,
William S. Tindall.
BY
Hovey & Hamilton
ATTORNEYS.

Patented Jan. 7, 1941

2,227,917

UNITED STATES PATENT OFFICE 2,227,917

AUTOMOBILE SIGNAL SWITCH

William S. Tindall, Kansas City, Kans.

Application February 23, 1938, Serial No. 192,036

1 Claim. (Cl. 200—59)

This invention relates to improvements in automobile signaling systems and particularly to mechanism which will operate a signal at both the front and rear of the vehicle to indicate the direction, the vehicle is about to turn, automatically by the rotary movement of the steering shaft of the automobile and without any conscious operation of other mechanism by the driver.

The principal object of the present invention is the provision of a simple automatic automobile signaling system whereby a warning signal will be given when the front wheels of the automobile are turned from the straight path.

With the foregoing and other objects in view, this invention comprises certain constructions, combinations and arrangement of parts as hereinafter set forth in the specification, referring to the drawing wherein:

Figure 1 is a partial view of certain of the automobile parts with signaling mechanism parts associated therewith, embodying this invention.

Fig. 2 is a sectional view taken on line II—II of Fig. 1; and

Fig. 3 is a diagrammatical view of the electric circuit of the signaling system.

Throughout the several views, like reference characters designate similar parts and the numeral 10 designates the steering post of an automobile which extends through the partition 12 which separates the driving compartment from the engine compartment. The steering post 10 carries the steering shaft 14, which is operatively connected with the steering wheel 16 to control the position of the front wheels of the car in the usual manner.

In order to expose a portion of the steering shaft 14, steering post 10 is split and spaced apart at 18. These two spaced apart ends of post 10 are secured in alignment by means of a housing member 20 having spaced apart tubular portions 22 and 24 into which the steering post end portions are respectively fitted. These parts are then secured against accidental movement by means of set screws 26.

The housing 20 is preferably circular in form as shown in Fig. 2, with the steering shaft 14 passing therethrough adjacent its outer edge.

Securely mounted on steering shaft 14, by means of set screw 28, is a pinion 30. This pinion rotates with the steering shaft, and since in the steering of an automobile the steering shaft makes several revolutions in turning the wheels through their entire angle of adjustment, it becomes necessary to greatly reduce the angle of rotation of the switch member, as hereinafter described.

Pinion 30 intermeshes with gear 32, which is mounted on spindle 34 for rotation in housing 20. Mounted for rotation with gear 32 is a pinion 36 which intermeshes with gear 38 rotatably carried by spindle 40, which is rotatably mounted in housing 20. The peripheral wall of housing 20 is divided into two sections, 42 and 44—42 being integral or securely affixed to the main portion of the housing, and 44 being secured thereto by means of screws 46 thereby making it possible to easily remove section 44.

An insulating block 48 is secured by means of screws 50 to section 44 and has an inner arcuate surface 52 concentric with the gear 38. Gear 38 is provided with an insulating block 54 which is secured by screws 56. An opening 58, extending through block 54 is provided with an adjustable screw plug 60, against which a spring 62 rests to urge contact brush 64, slidably mounted in opening 58, against the inner arcuate surface 52 of block 48. These parts are so related with respect to the steering wheels of the automobile, that when said wheels are in a straight ahead position, contact brush 64 will be at substantially the center point of the arcuate surface 52 of the insulating block 48. A series of contact members 66, 68 and 70 are positioned on insulating block 48 at one side of the center thereof, while contact points 72, 74 and 76 are at the opposite side of the center. These contact points are so positioned as to be in the line of travel of brush 64.

The train of gears from the steering shaft to brush 64 are such that when the steering shaft is operated to turn the car to the right, the brush will move in a like direction to contact points 72, 74 and 76 as the steering wheels of the car are moved from the straight away position to the extreme angle of curvature. Likewise when the steering wheels are turned to the left, the brush will successively contact points 66, 68 and 70. For convenience of construction and assembly, the top portion 78 of housing 20 is removable from the main portion of said housing.

Referring now to the diagrammatical view of the circuit, it will be noted that contact brush 64 is connected through spring 62, plug 60 and wire 80 to generator 82. This generator is of the type normally used in automobiles for generating current for the operation of the automobile and for charging the storage battery. Contact points 66 and 72 are connected respectively by wires 84 and 86 to wire 88 in which signal lights 90, 92 and 94 are in series. These lights are positioned respectively at the front, rear and on the instrument board of the automobile so as to display a slow signal. One end of wire 88 is connected with the generator as shown.

Contact 68 is provided with a conductor 96 which connects with wire 88, through a series of signal lights 98, 100 and 102 positioned respectively at the front, rear and on the instrument board of the automobile.

To indicate that the automobile is turning to the left, likewise wire 104 joins contact 74 with wire 88 which connects with the generator, and is provided with a series of lights 106, 108 and 102. Contact 76 is connected by wire 110 to wire 88 to generator 82, a series of lights 112, 114 and 116 are in series in wire 110 to indicate that the automobile is turning. Contact 70 is connected by means of wire 118 to wire 110 so that when brush 64 engages either contact 70 or 76, like signals will be given.

The signal boxes 120, 122 and 124 may have any suitable indicia, not shown, whereby the desired information will be given as to the slowing of the automobile, the direction of turning, and the turning operation.

The principal object of the instrument board signals, is to inform the operator as to the condition of the system. Should one of the lights or bulbs of any one of the three series be burned out, then the corresponding bulb at the instrument board would not light, thus indicating that that particular part of the system was inoperative.

Having thus described the invention, what is claimed as new and desired to be secured by Letters Patent is:

A combination with a split steering post on the steering shaft of an automobile, of an electric circuit making and breaking means, comprising a housing having spaced apart tubular portions into which are respectively secured spaced apart portions of said steering post; a train of gears mounted for rotation within said housing, a gear at one extremity of said train of gears being secured for rotation with said steering shaft between said tubular portions; the gear at the other extremity of said train of gears being provided with a radially disposed wiping contact member adapted to extend beyond the periphery of said associated gear and move through an arcuate path as the train of gears is operated by said steering shaft; an insulating block secured to said housing having an inner arcuate surface disposed concentrically outside said last named gear; and a series of contacts removably supported on the inner arcuate surface of said block within said housing in the path of travel of said contact member whereby an electric circuit is controlled, the outer contacts of said series of contacts being of greater arcuate extent.

WILLIAM S. TINDALL.